United States Patent [19]

Park et al.

[11] Patent Number: 4,999,525

[45] Date of Patent: * Mar. 12, 1991

[54] EXCLUSIVE-OR CELL FOR PATTERN MATCHING EMPLOYING FLOATING GATE DEVICES

[75] Inventors: Chin S. Park, Sunnyvale; Herman A. Castro, Shingle Springs, both of Calif.

[73] Assignee: Intel Corporation, Santa Clara, Calif.

[ * ] Notice: The portion of the term of this patent subsequent to Feb. 27, 2007 has been disclaimed.

[21] Appl. No.: 325,380

[22] Filed: Mar. 17, 1989

Related U.S. Application Data

[63] Continuation-in-part of Ser. No. 309,247, Feb. 10, 1989.

[51] Int. Cl.$^5$ ............................................. H03K 19/21
[52] U.S. Cl. .................................... 307/201; 307/464; 307/468; 307/471; 307/529; 364/807
[58] Field of Search ................. 307/201, 450, 464–465, 307/468–469, 471, 490, 501, 529; 364/513, 807; 365/184–185

[56] References Cited

U.S. PATENT DOCUMENTS

| | | | |
|---|---|---|---|
| 3,546,601 | 12/1970 | Hiltz | 307/201 X |
| 4,027,175 | 5/1977 | Hurst | 307/464 |
| 4,055,773 | 10/1977 | Schoett | 307/464 X |
| 4,202,044 | 5/1980 | Beilstein, Jr. et al. | 307/529 X |
| 4,617,479 | 10/1986 | Hartmann et al. | 307/465 |
| 4,660,166 | 4/1987 | Hopfield | 364/807 |
| 4,695,979 | 9/1985 | Tuvell et al. | 365/185 |
| 4,760,437 | 7/1988 | Denker et al. | 307/201 X |
| 4,773,024 | 9/1988 | Faggin et al. | 364/513 |
| 4,782,460 | 11/1988 | Spencer | 364/807 |
| 4,802,103 | 1/1989 | Faggin et al. | 364/513 |
| 4,807,168 | 2/1989 | Moopenn et al. | 364/807 |

Primary Examiner—David Hudspeth
Attorney, Agent, or Firm—Blakely, Sokoloff, Taylor & Zafman

[57] ABSTRACT

A semiconductor cell for producing an output current that is related to the match between an input vector pattern and a weighting pattern is described. The cell is particularly useful as a synapse cell within a neural network to perform pattern recognition tasks. The cell includes a pair of input lines for receiving a differential input vector element value and a pair of output lines for providing a difference current to a current summing neural amplifier. A plurality of floating gate devices each having a floating gate member are employed in the synapse cell to store charge in accordance with a predetermined weight pattern. Each of the floating gate devices is uniquely coupled to a combination of an output current line and an input voltage line such that the difference current provided to the neural amplifier is related to the match between the input vector and the stored weight.

16 Claims, 3 Drawing Sheets

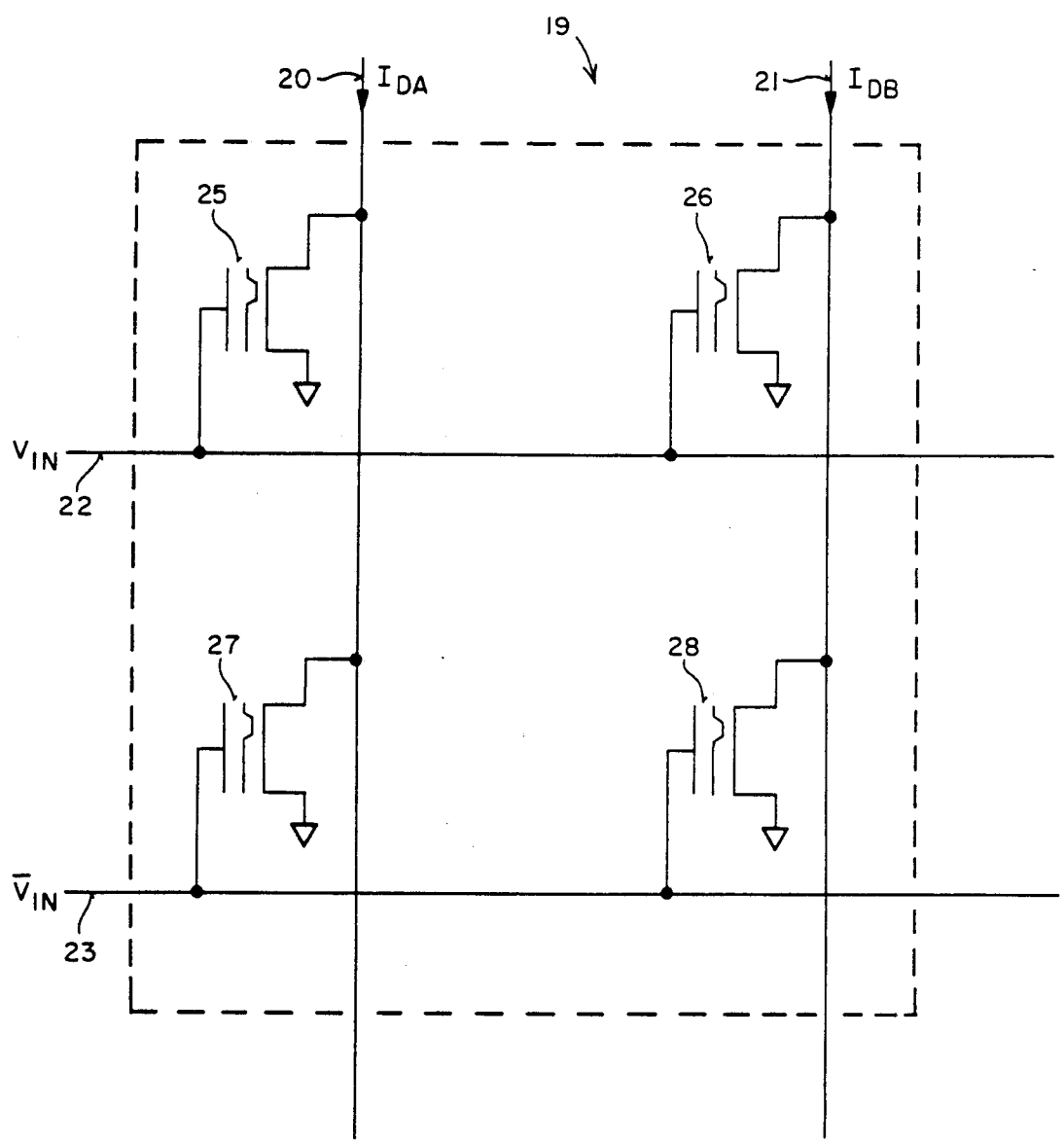
FIG_1

FIG_2
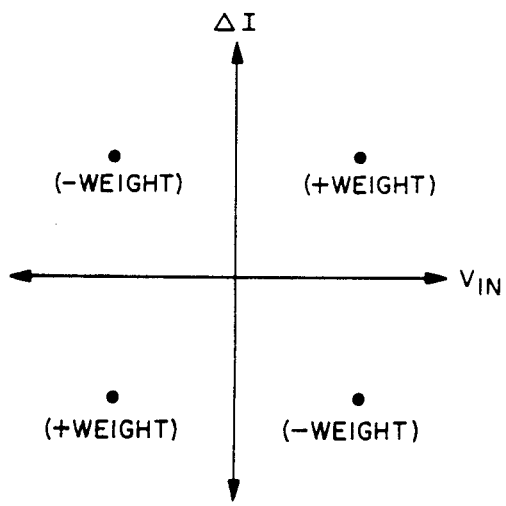
$\Delta I = I_{DA} - I_{DB} \sim \text{WEIGHT} * V_{IN}$
FIG_3
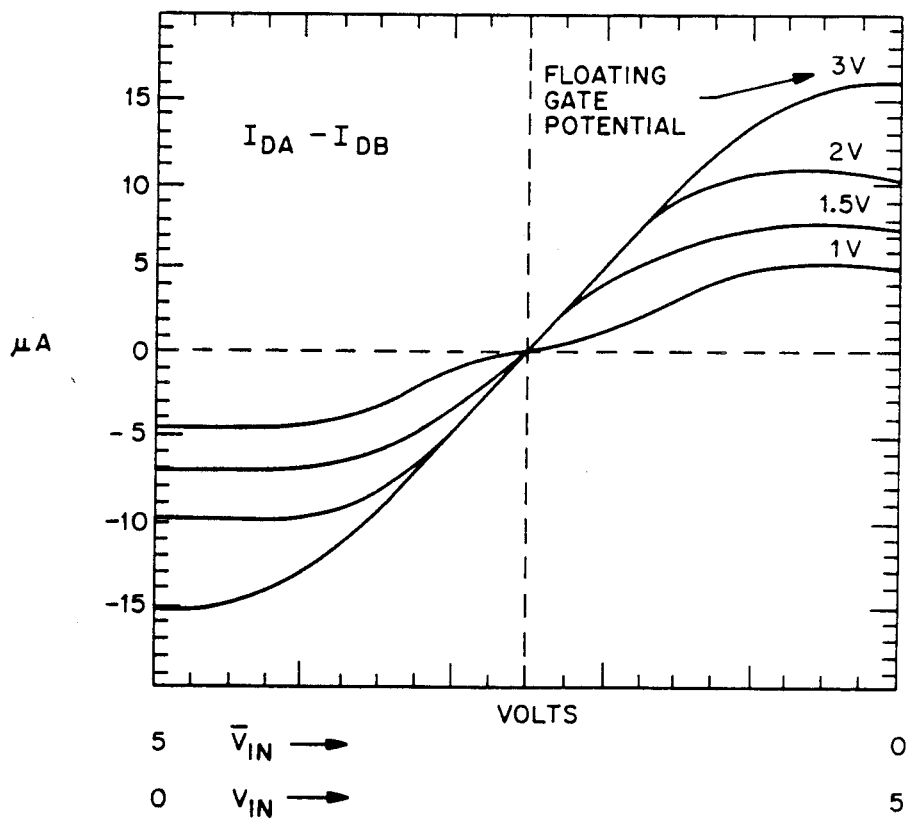

FIG_4
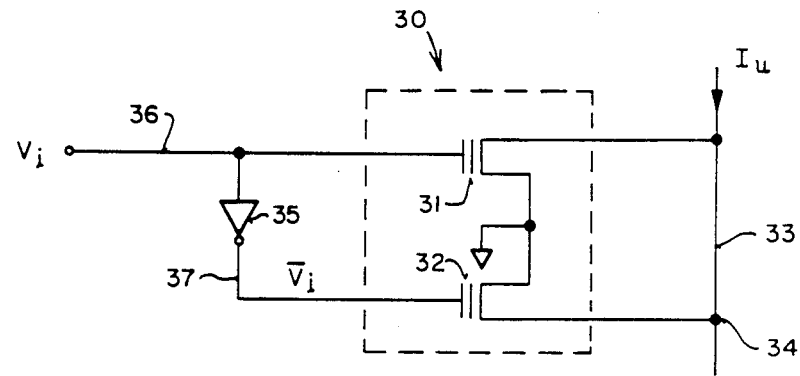
FIG_5
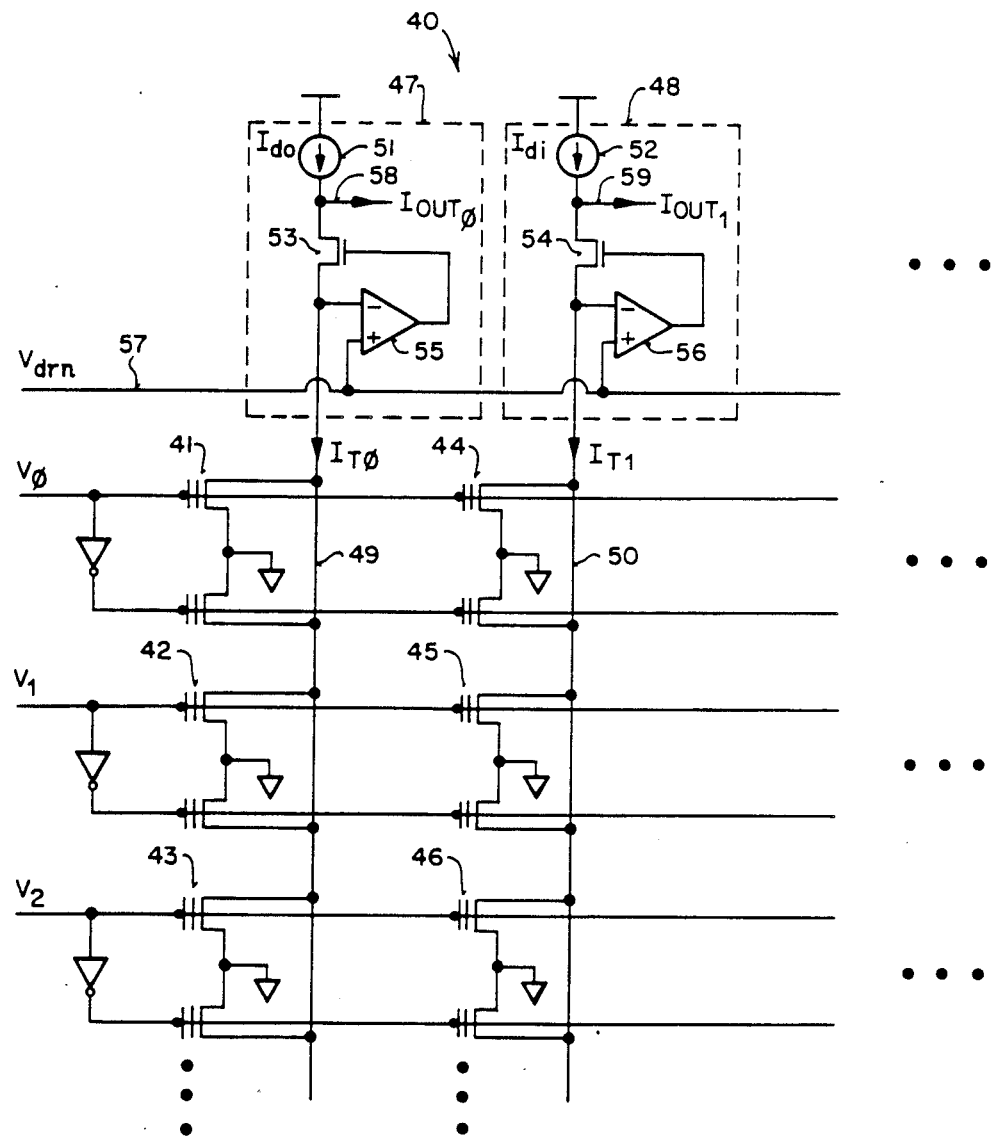

EXCLUSIVE-OR CELL FOR PATTERN MATCHING EMPLOYING FLOATING GATE DEVICES

CROSS-REFERENCE TO RELATED APPLICATIONS

This is a continuation-in-part of an application entitled "Exclusive-Or Cell for Neutral Network and the Like", Ser. No. 309,247, which was filed on Feb. 10, 1989, and which is assigned to the assignee of the present invention.

FIELD OF THE INVENTION

The invention relates to the field of semiconductor cells, particularly those cells useful in performing pattern matching in neural networks.

BACKGROUND OF THE INVENTION

The search for new approaches to parallel computing and advanced data storage and retrieval have generated a great deal of interest in neural networks. In general, neural networks attempt to duplicate the logic performed by the human brain and the brains of other animals. The circuit models that have been proposed provide for both learning (e.g., a programming mode) and decision-making (e.g., recognition, associative memory, etc.). For a broad discussion of neural networks, see "A Neuralmorphic VLSI Learning System", by Aspector and Allan, Advanced Research in VLSI, *Proceedings of a* 1987 Stanford Conference.

FIG. 6 of the Alspector paper shows a typical neuron or cell. A neuron includes dendrites (inputs), synapses (connections), neuron body (summing amplifier) and axon (output). Often, the synapses for these cells are implemented by using digital registers and digital-to-analog convertors to provide a weighting factor or function. Other circuit means are provided to multiply the input signal by this weighted factor. An example of such a synapse is found in co-pending application entitled "Semiconductor Cell For Neural Network Employing A Four-Quadrant Multiplier", Ser. No. 283,553, filed on 12/09/88 and assigned to the assignee of the present invention. The weighting factor associated with a given synapse represents a connection strength within the neural network.

One category of tasks that neural networks are useful in performing are recognition tasks, i.e., analyzing data and identifying which features are present. This involves matching templates and expected features to the data and finding the best fit or a list of good fits. In pattern matching problems the same stored patterns are repeatedly compared to different input patterns using the same calculation. One measure of the difference between two binary patterns is the "Hamming distance". A binary pattern or binary vector is defined within the context of this application to be a string of 1's and 0's (bits) in which the sequence of the bits is meaningful. Mathematically, the Hamming distance between two patterns is the number of the bits which are different in the two patterns in corresponding positions. Of course, both patterns must have the same number of bits for the Hamming distance to have any real meaning. The Hamming distance calculation is logically identical to EXCLUSIVE-ORing bits in corresponding positions in the binary patterns and summing the results.

While there have been several cells proposed for implementing the EXCLUSIVE-OR function and volatile data storage in amplifier neural networks (e.g., Clark et al., "A Pipelined Associative Memory Implemented in VLSI", *IEEE Journal of Solid-State Circuits*, Vol. 24, No. 1, pp. 28–34, Feb. 1989), applicant is unaware of any proposed devices capable of performing the EXCLUSIVE-OR function and non-volatile data storage. As will be seen, the present invention comprises a semiconductor cell capable of performing the EXCLUSIVE-OR function and non-volatile storage of a single bit of information. This cell is well-suited for performing pattern recognition tasks and for computing the Hamming distance between two binary patterns.

SUMMARY OF THE INVENTION

A semiconductor cell for computing the Hamming distance between a stored weight and input voltage is described. The cell is particularly useful for, but is not limited to, pattern recognition tasks in a neural network. The cell includes a plurality of floating gate devices each having a floating gate member which is used to store charge in accordance with a predetermined weight pattern. Each of the floating gate devices has its drain coupled to an output current line, which acts as a column or bit line within an array, and its control gate coupled to an input voltage value. The floating gate devices are arranged in such a way that the output current provided along the bit or output current line is directly related to the match between the input voltage vector pattern and the stored weight pattern.

The cell described in the present application is also useful as an analog multiplier. As an analog multiplier, the input vector pattern and stored weight pattern may assume analog rather than digital values. When used this manner, the summed output current is approximately equal to the product of the stored weight and the input vector value.

BRIEF DESCRIPTION OF THE DRAWINGS

The present invention will be understood more fully from the detailed description given below and from the accompanying drawings of the preferred embodiment of the present invention, which, however, should not be taken to limit the invention to the specific embodiment but are for explanation and understanding only.

FIG. 1 illustrates the currently preferred embodiment of the present invention.

FIG. 2 illustrates the difference current versus input voltage characteristics of the present invention for a binary input vector and a digitally stored weight.

FIG. 3 shows the difference current versus difference input voltage for various programmed floating gate potentials. This figure illustrates how the present invention may be used as an analog multiplier within a neural network.

FIG. 4 illustrates an alternative embodiment of the present invention.

FIG. 5 shows an array of exclusive-or cells of the type shown in FIG. 4 and how they may be arranged to compare an input vector with a stored digital weight pattern.

DETAILED DESCRIPTION OF THE PRESENT INVENTION

A semiconductor cell employing floating gate memory devices which is particularly suited for neural networks and the like is described. In the following description, numerous specific details are set forth, such as specific conductivity types, etc., in order to provide a more thorough understanding of the present invention. It will be obvious, however, to one skilled in the art that these specific details need not be used to practice the present invention. In other instances, other well-known structures and circuits have not been shown in detail in order to avoid unnecessarily obscuring the present invention.

Typically, in a neural network inputs (e.g., stimuli) are coupled via resistors to the input terminals of current summing amplifiers. The output of each of these amplifiers provides signals that may be coupled—via a second set of resistors—to the inputs of another set of current summing amplifiers in the next layer of the neural network. Input signals provide contributions to the output signals through resistors which are analogous to the synapses in biological neurons. Thus, an input voltage vector contributes a current to the input of the neural amplifiers through a set of resistors or synapses. In the simplest neural networks, the resistors are either short circuits or open circuits, or they may have a discrete value. In those neural networks for learning, decision-making and pattern recognition, the resistors are assigned a binary weight value corresponding to the strength of the synapse connection.

DISCUSSION OF THE PREFERRED EMBODIMENT

Referring to FIG. 1, a currently preferred embodiment of the present invention is shown which is useful as a synapse cell. When used for this application, semiconductor cell 19 couples an input vector, $V_{IN}$, to a set of current summing neural amplifiers within a network. The connection to the neural amplifiers is made differentially along lines 20 and 21. The input vector, $V_{IN}$, and its complement, $\overline{V_{IN}}$, are provided on lines 22 and 23, respectively.

As can be seen in FIG. 1, the present invention makes use of a plurality of well-known prior art memory cells which have members that are electrically charged. These are shown in FIG. 1 as floating gate devices 25–28. Most often, these devices employ polysilicon floating gates which are completely surrounded by insulation (e.g., silicon dioxide). Charge is transferred onto these floating gates through a variety of mechanisms such as avalanche injection, channel injection, tunnelling, etc. The charge on the floating gate affects the conductivity in the device. If the conductivity is above a certain level, the device is deemed to be programmed in one binary state. If the conductivity is below another level, it is deemed to be programmed in the other binary state. For analog applications the floating gate change is controlled to provide intermediate levels of conductivity between the upper and lower limits.

These memory device take a variety of forms in the prior art, some being both electrically erasable and electrically programmable and others requiring for example, ultraviolet light for erasing. The devices are incorporated into memories referred to in the prior art as EPROMS, EEPROMS or flash EEPROMS. The currently preferred embodiment of the present invention employs either EPROM or EEPROM devices to control the current flowing along lines 20 and 21. EEPROMS are particularly well-suited for applications which require learning with iterative corrections, whereas EPROM devices are preferred while die size is of paramount concern.

Referring again to FIG. 1, cell 19 shows floating gate device 25 having its drain coupled to output current line 20 and its source grounded. Each of the floating gate devices of FIG. 1 are ordinary n-channel EEPROM devices. The control gate of floating gate device 25 is coupled to the $V_{IN}$ input along line 22. Similarly, device 26 has its drain coupled to line 21, its source grounded and its control gate coupled to line 22. Floating gate device 27 has its drain coupled to line 20, its source grounded and its control gate coupled to line 23. To complete cell 19, floating gate device 28 has its drain coupled to line 21, its source grounded and its control gate coupled to line 23. Line 23, of course, is coupled to the $\overline{V_{IN}}$ input. As will be discussed in more detail later, each of the floating gate devices of semiconductor cell 19 are used to store a weight pattern—the pattern being stored on the floating gate members of the array of devices—which may be either digital or analog in nature.

Recharging and discharging of the floating gate members may occur in a manner well-known in the prior art. For example, to program device 25 line 20 (connected to the drain region of device 25) and line 22 (connected to the control device of line 25) are raised to a high positive potential. A high positive voltage on the control gate of device 25 causes electrons to tunnel through the thin oxide near its drain and be captured by the floating gate, raising its (programming) threshold. Electrons are removed from the floating gate of device 25 by taking the control gate of device 25 connected to line 22 to a voltage at or near ground potential. The drain of device 25 is then taken to a high voltage by raising the potential on line 20. The source either floats or remains grounded. This application of a high bias to the drain of device 25, while its control gate is grounded, causes electrons to tunnel from the floating gate to the drain—thereby reducing the (erasing) threshold of device 25. In a manner similar to that just described, floating gate devices 26, 27 and 28 may also be programmed or erased by either raising or lowering the potential on lines 22, 23, 20 and 21 in accordance with the description given above.

A weight pattern is stored into semiconductor cell 19 by programming, (i.e., charging) certain floating gate devices to a predetermined level while erasing, (i.e., removing charge) other devices. By way of example, a digital weight pattern of "+1" may be stored in cell 19 by erasing the floating gate members of floating gate devices 25 and 28 while, at the same time, programming devices 26 and 27. Conversely, a weight of "−1" is stored in cell 19 by erasing devices 26 and 27 and programming devices 25 and 28. An illustration of such a programming pattern is provided in Table 1, in which letters "E" and "P" denote a device that is either erased or programmed, respectively.

TABLE 1

| Weight Value | Programming Pattern | |
|---|---|---|
| +1 | $Q_{25}$ = E | $Q_{26}$ = P |
|  | $Q_{27}$ = P | $Q_{28}$ = E |
| −1 | $Q_{25}$ = P | $Q_{26}$ = E |
|  | $Q_{27}$ = E | $Q_{28}$ = P |

To better understand the operation of the present invention, consider the case in which a weight pattern of "+1" has been stored into semiconductor cell 19. Assume that a digital input vector element, $V_{IN}$, having a value corresponding to a logical "1", (e.g. 5 volts) is applied along line 22. The complement vector element, $\overline{V}_{IN}$, having a value corresponding to a logical "0", (e.g. 0 volts) is applied along line 23. According to Table 1, a weight pattern of "+1" means that devices 25 and 28 are erased while devices 26 and 27 are programmed. Being programmed, the floating gate members of floating gate device 26 and 27 have sufficient charge residing on them so as to inhibit the formation of a conducting channel between their respective source/drain regions. This charge layer prevents current from flowing in devices 26 and 27. Consequently, devices 26 and 27 do not contribute to the currents $I_{DB}$ and $I_{DA}$, respectively.

With the application of vector element, $V_{IN}$, to the control gate of device 25, a conducting channel is formed between the source and drain regions. The current flowing through device 25 increases the read current $I_{DA}$ on line 20. Conversely, because device 26 is programmed, the application of a high potential on line 22 does not increase the current $I_{DB}$ flowing down line 21. Meanwhile, since $\overline{V}_{IN}$ has a voltage potential at or near ground potential, device 28 remains non-conductive so that it does not contribute to the current $I_{DB}$ flowing along line 21. Thus, applying an input vector value of logical "1" to semiconductor cell 19, which has been previously programmed to have a weight value of "+1", produces a positive difference current $\Delta I$ ($= I_{DA} - I_{DB}$).

Table 2 illustrates the complete range of possible combinations for a binary input vector element and a binary stored weight. Note than an input vector value $V_{IN} = "+1"$ corresponds to $V_{IN} = 5$ volts, $\overline{V}_{IN} = 0$ volts while a value of $V_{IN} = --1"$ corresponds to $V_{IN} = 0$ volts and $\overline{V}_{IN} = 5$ volts. With reference to Table 2, when a logical "1" input vector is applied to a cell storing a "−1" weight a current difference of "−1" is produced, and so on. Table 2 reveals that the present invention performs an EXCLUSIVE-OR function—calculating the vector difference between a binary input pattern and a stored binary weight pattern. The analog current difference generated at the outputs along the line 20 and 21 is directly related to the strength of the match between the input vector and stored weight pattern. Thus, the Hamming distance between two patterns can be readily computed. It should be appreciated that the present invention could also be viewed as performing an EXCLUSIVE-NOR function, if, for example, a "+1" in table 2 is made to correspond to a logical "1", with "−1" corresponding to a logical "0".

TABLE 2

| Input Vector Element Value ($V_{IN}$) | Weight Value | Difference Current ($\Delta I = I_{DA} - I_{DB}$) |
|---|---|---|
| +1 | +1 | +1 |
| +1 | −1 | −1 |
| −1 | +1 | −1 |
| −1 | −1 | +1 |

FIG. 2 shows the operating characteristics of semiconductor cell 19. The blackened dots of FIG. 2 correspond to the various operating points for a binary set of stored weights and input vector values. The difference current $\Delta I$, representing $I_{DA}$ minus $I_{DB}$, is shown on the vertical axis while the horizontal axis represents the input voltage vector element. As can be seen from FIG. 2, cell 19 has four discrete operating points corresponding to each of the four possible input and weight combinations. For example, when a "+1" input vector is applied to a cell storing a "+1" weight value, a "+1" current difference results. Applying the same input to a cell storing a "−1" weight pattern produces a "−1" current difference (e.g., $I_{DB}$ greater than $I_{DA}$). With a "−1" input pattern applied, the situation is reversed. In other words, a negative stored weight produces a positive current difference while a positive weight results in a negative difference current. It should also be mentioned that even when operated digitally, the difference current is approximately equal to the product of the weight pattern (represented by the charge stored on the various floating gate members) and the vector input value.

Devices 25–28 are normally fabricated identically so that the weighting factor is impervious to fluctuations in temperature, supply, processing, etc. In the preferred embodiment of the present invention, floating gate devices 25–28 are N-channel EEPROM devices.

A weight of "0" can also be derived for cell 19 by either programming (i.e., charging) or erasing (i.e., removing charge) all of the floating gate devices. With a weight of "0", the synapse is made inactive and the difference current is zero. To produce an input vector having a value of logical "0", $V_{IN}$ is made equal to $\overline{V}_{IN}$, in which case lines 22 and 23 are both taken either high or low. When either the weight or the input vector assume a value of "0", the difference current remains zero, i.e., $I_{DA} = I_{DB}$.

Synapse cell 19 is also useful as an analog multiplier. For this particular application, cell 19 receives analog rather than digital voltage inputs. Synapse cell 19 then multiplies this analog input by a stored weighting factor or function. The weighting factor or function is represented by the difference in the charge stored on the various floating gates of cell 19. The input voltage and the charge pattern in cell 19 determines the current flowing through each of the floating gate devices; thereby causing the output current difference along lines 20 and 21 to be approximately a product of the input voltage and the charge difference.

FIG. 3 shows the current transfer characteristics of cell 19 for various floating gate programming potentials. In each of the curves of FIG. 3, floating gate devices 25 and 28 are erased so that there is no charge residing on the floating gate members of those devices. With devices 25 and 28 erased, various potentials are programmed onto the floating gates of devices 26 and 27. FIG. 3 shows programming potentials of 1, 1.5, 2 and 3 volts. Obviously, the larger the programming potential, the larger the resultant current swing. Each of the curves of FIG. 3 was produced by ramping the $V_{IN}$ input from zero volts to 5 volts while simultaneously ramping its complement $\overline{V}_{IN}$ from 5 volts to zero volts.

A mirrored response, in which the difference current is initially positive and transitions negative when $V_{IN}$ ramps from "0" to "1", may be produced by reversing the programming pattern. The weight pattern is reversed by erasing devices 26 and 27 and then altering the programming voltages associated with devices 25 and 28. This has the effect of producing a current difference $I_{DA} - I_{DB}$ which is initially positive—switching negative after the input voltage $V_{IN}$ switches from zero volts to 5 volts. Furthermore, if the input voltage range is limited, for example between 2 and 4 volts, then a linear output results.

DISCUSSION OF THE EMBODIMENT OF FIG. 4

Referring now to FIG. 4, an alternative embodiment of the present invention is shown. This embodiment has the advantage of accommodating single-ended operation, i.e., where a single input voltage is compared to a single bit in a binary pattern to produce a current along a single output line. Additionally, the cell of FIG. 4 benefits from a reduced device count, silicon area, power consumption and size of accompanying interface circuitry. Whereas the cell of FIG. 1 represents a four-quadrant multiplier, the cell of FIG. 4 is a two-quadrant device.

In FIG. 4, semiconductor cell 30 utilizes two floating gate devices 31 and 32. This cell implements the EXCLUSIVE-OR function with the minimal number of devices. These devices may comprise any type of electrically programmable memory device such as EPROMs, EEPROMs, or flash EEPROMs. FIG. 4 shows devices 31 and 32 comprising ordinary n-channel EPROM devices of a type well-known in the art. Both devices have their drain regions coupled to output current line 33 while their sources remain grounded. The control gate of EPROM device 31 is coupled directly to the voltage input, $V_I$, along line 36. The control gate of EPROM device 32 is coupled to the output of inverter 35 which has its input coupled to line 36. Thus, the input to the control gate of EPROM device 32 represents the complement of the voltage input $V_I$.

Recharging and discharging of the floating gate members of devices 31 and 32 may occur in a manner well-known in the prior art, as previously discussed in connection with FIG. 1. Thus, a digital weight pattern is stored in semiconductor cell 30 by programming, (i.e., charging) certain floating gate devices to a predetermined level while erasing (i.e., removing charge) other devices. A programmed EPROM device is characterized by a high threshold voltage while an erased or unprogrammed EPROM device is characterized by a low threshold voltage.

To better understand the operation of cell 30, consider the case in which device 31 has been erased while device 32 has been programmed to a predetermined level. This programmed weight pattern, by way of choice, may be defined to represent a logical "0" state. If a binary input voltage, $V_I$, having a value of a logical "1" (e.g., 5 volts) is applied to line 36 then a conducting channel will be formed between the source and drain regions of EPROM device 31 and current will flow. This current, represented by $I_u$ in FIG. 4, contributes to the output summing line current flowing along line 33. (See FIG. 5, where summing line currents flow along lines 49 and 50). A positive contribution of current on line 33 may be similarly defined as corresponding to a logical "1" output stage. Thus, applying a "1" input voltage to a cell 30 storing a weight of "0" produces an incremental current contribution, $I_u$, to line 33 which corresponds to a "1" output state. In the same manner, applying a "0" input (e.g., 0 volts) to cell 30 storing a weight of "1" (device 31 has been programmed while device 32 has been erased) produces the same incremental current, $I_u$, on line 33 through device 32. For the other cases, such as "0" input to a cell of a "0" weight, and "1" input to a cell having a "1" weight, the cell does not contribute to the current on line 33. Therefore, by this assignment of logic states, semiconductor cell 30 performs the EXCLUSIVE-OR function. Alternatively, by redefining the states the EXCLUSIVE-NOR function can be implemented (e.g., "0" state defined to be present when device 31 is programmed and 32 erased; state "1" defined when device 31 is erased and 31 programmed).

Another way of analyzing the circuit of FIG. 4 is to consider the equivalent resistance looking back into cell 30 from node 34. For the case just described above (input voltage="1"; stored binary weight="0"), the equivalent resistance looking back into cell 30 is low. Alternatively, if a logical "0" voltage was applied to the same stored weight, the equivalent resistance looking back into the circuit would be high. This is consistent with the EXCLUSIVE-OR function of cell 30.

Table 3 shown below summarizes the complete range of possible combinations of binary input values and binary stored weights. As is readily seen by referring to Table 3, the present invention performs the EXCLUSIVE-OR function; calculating the vector difference between a binary input voltage and a stored digital weight pattern. Using the cell of FIG. 4, the Hamming distance between two binary patterns can be easily computed.

TABLE 3

| $V_i$ | $Q_{31}$ | $Q_{32}$ | Weight Value | $I_u$ |
|---|---|---|---|---|
| 0 | E | P | 0 | Low = 0 |
| 0 | P | E | 1 | High = 1 |
| 1 | E | P | 0 | 1 |
| 1 | P | E | 1 | 0 |

As described in connection with FIG. 1, cell 19 of FIG. 4 also performs an analog multiplication of an input voltage value and a stored weight pattern represented by the charge residing on floating gate devices 31 and 32. For this application, inverter 35 must function in an analog manner, i.e., as a voltage inverting buffer. A voltage inverting buffer can be implemented by an operational amplifier and resistors, or a linear transconductance element such as that described in U.S. Pat. No. 4,760,349. When employed in this way, the output current $I_u$, is directly proportional to the product of the input voltage and the stored weight. Therefore, intermediate values of voltages can be applied to cell 30 which then functions as an analog multiplier.

Referring now to FIG. 5, an array 40 of semiconductor cells of the type just described is shown. As illustrated, each cell occupies one position in the array, with a plurality of cells connected to a common bit line. For instance, cells 41, 42 and 43 are each coupled to common bit line 49. The inputs to each of the cells within the array are coupled to the individual vector elements of input voltage vector $V_{xy}$. Read current is established along lines 49 and 50, and generally throughout the array, by a plurality of field-effect devices such as blocks 47 and 47, respectively. Current sources or mirror devices 51 and 53 can be implemented using field-effect transistors with a common current reference. Device 53 and differential amplifier 55 set the summing line voltage on line 49 to be the same as the pre-defined DC voltage $V_{drn}$, present on line 57. Output current 58, $Iout_0$, is equal to the difference between $I_{d0}$ and $I_{T0}$. In this example, the Hamming distance between the input vector V and the vector stored on the cells coupled to line 49 (cells 41, 42, 43, etc.) is derived at line 58 when $Id0$ is set to Nc times of unit cell current ($N_c \cdot I_u$, where $N_c$ is the number of calls along the summing line 49 and the array is programmed for EXCLUSIVE-NOR implementation). Many variations are possible using this type of read circuitry depending on the particular application.

During operation, individual input voltage vector elements are compared with corresponding bits of the stored weight pattern; each cell producing an incremental current. Each of the incremental currents are then summed along the associated bit lines. Thus, the total current $I_{T0}$ flowing down line 49 is the sum of the individual current contributions from each cell (e.g., 41, 42, 43, etc.) associated with that line.

It should be appreciated that the current transfer characteristics of cell 30 are similar to those discussed above in connection with FIG. 1, and that devices 31 and 32 are normally fabricated identically so that the weighting factor is impervious to fluctuations and temperature, supply, processing, etc.

Whereas many alternations and modifications of the present invention will no doubt become apparent to the person of ordinary skill in the art after having read the foregoing description, it is to be understood that the particular embodiment shown and described in way of illustration is in no way intended to be considered limiting. For example, although this disclosure has shown the use of floating gate devices for storing a weight pattern, other memory devices, such as an ordinary field-effect transistor having its gate in series with a capacitor, could also be used without detracting from the spirit or scope of the present invention. Therefore, reference to the details of the illustrated circuits are not intended to limit the scope of the claims which themselves recite only those features regarded as essential to the invention.

Thus, a semiconductor cell for performing the EXCLUSIVE-OR operation between an input voltage vector and a stored weight has been described.

We claim:

1. A semiconductor cell for use in computing the Hamming distance between a stored weight and an input voltage comprising:
   means for generating the complement of said input voltage;
   a pair of floating gate devices for storing said weight, each of said floating gate devices having a drain coupled to an output line and a source coupled to ground potential,
   one of said floating gate devices having its control gate coupled to said input voltage and the other of said floating gate devices having its control gate coupled to said complement such that the current produced on said output line in response to said input voltage is related to the match between said input voltage and said stored weight.

2. The semiconductor cell of claim 1 further including programming means for programming said stored weight on said floating gate devices.

3. The semiconductor cell of claim 2 wherein said input voltage, complement, weight and output current have binary values such that said cell performs the EXCLUSIVE-OR function.

4. The semiconductor of claim 2 wherein said floating gate devices are matched.

5. The semiconductor cell for producing an incremental output current which corresponds to the EXCLUSIVE-OR operation of an binary input voltage and a digitally stored weight, said cell comprising:
   an output summing line for carrying said output current;
   an inverter means for producing the complement of said binary input voltage; and
   a pair of electrically programmable floating gate memory devices each having their drains coupled to said output summing line and alternate ones of their control gates coupled to said binary input voltage and said complement, respectively;
   said weight being stored on the floating gate members of said devices such that said output current is generated whenever said input voltage and said weight are different.

6. The cell of claim 5 further comprising programming means for programming said stored weight on said floating gate devices.

7. The semiconductor cell of claim 5 wherein each of said floating gate devices is programmed to an opposite binary state, the combination of said opposite binary states representing said weight.

8. In a neural network, a semiconductor cell useful in performing pattern matching tasks comprising:
   an output current line;
   a first floating gate device having its drain coupled to said output current line, its source grounded, and its control gate coupled to a input voltage;
   a second floating gate device having its drain coupled to said output current line, its source grounded and its control gate coupled to the complement of said input voltage;
   said first and second floating gate devices storing a weight on their floating gate members such that the output current provided on said output current line is related to the match between said input vector and said stored weight.

9. The cell of claim 8 further comprising programming means for programming said weight onto said floating gate devices.

10. The synapse cell of claim 9 wherein said input voltage and said weight represent binary values such that the current produced on said output current line corresponds to the EXCLUSIVE-OR operation of said input voltage and said weight.

11. The cell of claim 10 wherein said current produced on said output current line is proportional to the analog multiplication of said input voltage and said weight.

12. A device for computing the Hamming distance between two binary patterns comprising a plurality of cells arranged so as to form an array, said array also having a plurality of column lines associated with separate columns of said cells, each cell of said array computing the match between corresponding elements of an input voltage vector and a stored weight pattern, and wherein each cell includes:
   a pair of floating gate devices each having their drains coupled to one of said column lines, and their sources coupled to ground, the control gate of one of said floating gate devices being coupled to an input voltage vector element while the control gate of the other floating gate device is connected to the complement of said input voltage vector element,
   said floating gate devices storing said weight pattern element on their floating gates such that an incremental output current related to the match between said input voltage vector element and said element of said stored weight is produced on said column line.

13. The device of claim 12 wherein said incremental currents produced by each of said cells associated with one of said column lines are summed to produce a total column current.

14. The device of claim 13 wherein the sum of said total column currents is related to the match between said input voltage vector and said stored weight.

15. The device of claim 13 wherein the sum of said total column currents corresponds to the Hamming distance between said input voltage vector and said stored weight.

16. The device of claim 15 further comprising programming means for programming said stored weight into said cells of said array.

* * * * *

UNITED STATES PATENT AND TRADEMARK OFFICE
CERTIFICATE OF CORRECTION

PATENT NO. : 4,999,525

DATED : March 12, 1991

INVENTOR(S) : Chin S. Park; Hernan A. Castro

It is certified that error appears in the above-identified patent and that said Letters Patent is hereby corrected as shown below:

ON TITLE PAGE:

Please correct the misspelling of the inventor's name.

Delete: "Herman A. Castro"

Insert: --Hernan A. Castro--

Signed and Sealed this

First Day of September, 1992

Attest:

DOUGLAS B. COMER

*Attesting Officer*  *Acting Commissioner of Patents and Trademarks*